United States Patent [19]

Spaniol et al.

[11] 4,355,403
[45] Oct. 19, 1982

[54] TELETYPEWRITER LINE KEYER WITH SWITCHING CURRENT REGULATOR

[75] Inventors: John W. Spaniol, Studio City; Ronald E. Tollum, Simi Valley, both of Calif.; Julius A. Barthelme, Woodsboro, Md.

[73] Assignee: Frederick Electronics Corporation, Frederick, Md.

[21] Appl. No.: 44,652

[22] Filed: Jun. 1, 1979

Related U.S. Application Data

[63] Continuation of Ser. No. 909,653, May 25, 1978, abandoned.

[51] Int. Cl.³ ............................ G05F 1/40; H03K 1/14
[52] U.S. Cl. .................................. 375/36; 178/3; 323/282; 323/285
[58] Field of Search ............... 375/36, 68, 71; 178/3, 178/69 G; 179/84 R; 323/349–351, 271, 274, 282, 285, 281, 283, 284, 290; 307/139, 140, 149

[56] References Cited

U.S. PATENT DOCUMENTS

| | | | |
|---|---|---|---|
| 3,317,820 | 5/1967 | Nylander | 307/255 |
| 3,383,584 | 5/1968 | Atherton | 323/286 |
| 3,518,527 | 6/1970 | Russell | 323/223 |
| 3,643,405 | 2/1972 | Vukasovic | 323/271 |
| 3,665,291 | 5/1972 | Weischedel et al. | 323/286 |
| 3,675,159 | 7/1972 | Judd et al. | 323/286 |
| 3,725,678 | 4/1973 | Reddy | 323/285 |
| 3,743,887 | 7/1973 | Keough et al. | 179/77 |
| 3,771,039 | 11/1973 | Steward | 370/71 |
| 3,781,653 | 12/1973 | Marini | 323/284 |
| 3,790,816 | 2/1974 | Berman | 323/282 |
| 3,867,567 | 2/1975 | Herron | 178/3 |
| 3,931,566 | 1/1976 | Pask et al. | 323/285 |
| 3,986,100 | 10/1976 | Beierholm et al. | 323/285 |
| 4,017,745 | 4/1977 | McMahon | 323/282 |
| 4,047,055 | 9/1977 | Romano | 307/262 |
| 4,194,147 | 3/1980 | Payne | 307/53 |

OTHER PUBLICATIONS

Eugene R. Hnatek, 'Choose Switching Regulators', Mar. 15, 1975 in Electronic Design, pp. 54–58.

*Primary Examiner*—Benedict V. Safourek
*Assistant Examiner*—Stephen Chin
*Attorney, Agent, or Firm*—Arnold, White & Durkee

[57] ABSTRACT

A teletypewriter line keyer with a switching current regulator responsive to a floating, loop current powered voltage comparator used as a loop current monitor. The line keyer, which may have positive and negative line current keying, uses a single current monitor to control positive and negative current regulators responsive to the positive and negative keying respectively. The switching regulators operate within a relatively narrow band centered around the nominal signaling current, with filtering being provided for ripple control. The circuit may also include a keying detector and open loop detector for system monitoring.

18 Claims, 8 Drawing Figures

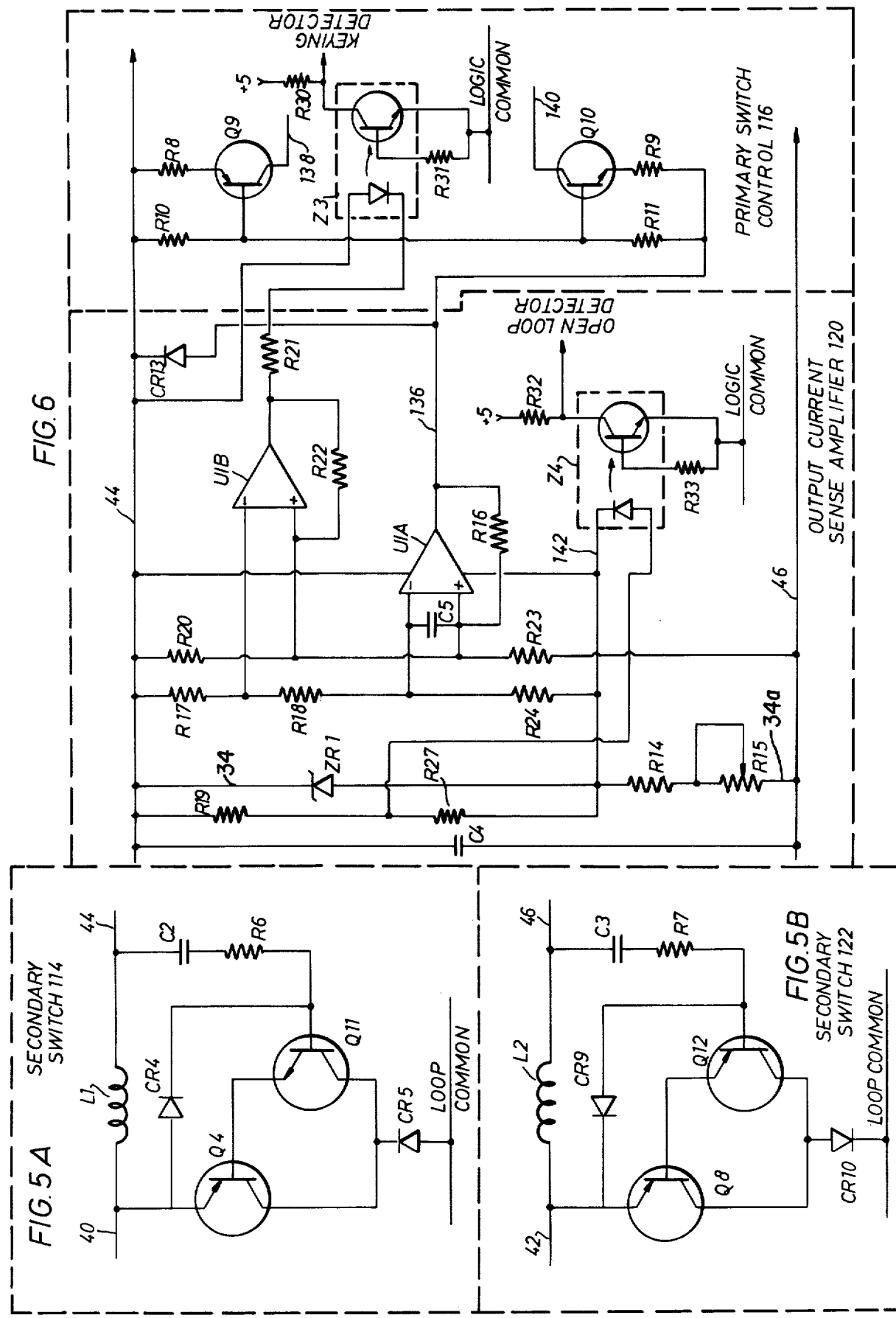

TELETYPEWRITER LINE KEYER WITH SWITCHING CURRENT REGULATOR

CROSS-REFERENCE TO RELATED APPLICATIONS

This application is a continuation of Ser. No. 909,653, filed May 25, 1978, and entitled "TELETYPE LINE KEYER WITH SWITCHING CURRENT REGULATOR", now abandoned.

BACKGROUND OF THE INVENTION

1. Field of the Invention

The present invention relates to the field of teletypewriter type switching systems for remote signaling and communication purposes. Also, the present invention relates to an improved teletypewriter keyer circuit for transmitting serial data in the form of a current in a load to a terminal for remote signaling.

2. Prior Art

In certain applications, it is desired to transmit switching signals over a line or lines for remote signaling and data communication purposes. In such a system, the receiver commonly has predetermined operating characteristics in terms of voltage and current, these parameters, of course, being related by the impedance thereof. The line or lines over which the signal is to be transmitted from the source to the receiver, however, are of widely varying characteristics, dependent upon the nature of the system, the distances over which signaling is to be achieved, etc. By way of example, while some systems use two lines, many systems simply use a single line with an earth return, so that the impedance of the line or lines may vary tremendously with the distances, condition of the lines, etc., ranging from a relatively low impedance up to an open circuit. Obviously, while communication over an open circuit is not achievable, reliable communication over a line or lines having an impedance on the order of or even substantially larger than that of the receiver is desired. Therefore, establishing line voltage at the sending end will not assure the receipt of adequate power at the receiving end for operation of the receiver.

Historically, teletypewriter systems have used a relatively high voltage battery, typically having a voltage of a hundred volts or more, with a large resistor in series therewith. When the keyer is closed, the battery and resistor are coupled across the line, the resistor limiting the current to safe limits even for a particularly low impedance line. This type of passive current regulation has the disadvantage however, of dissipating large amounts of battery power in comparison to the power put onto the line, and has the further disadvantage of providing poor regulation as line impedances become large.

In more recent times, active series regulators have been used in place of the current limiting resistors so as to provide well regulated current sources for driving the lines substantially independent of the line impedance, at least for line voltages approaching the battery voltage. Such regulators have the advantage of being electrically quiet, i.e. low ripple in the output current, and operate well over a wide range of line impedances, through still dissipate a large amount of power in comparison to the transmitted power. Because of the high power dissipation, such systems are relatively expensive and may have reduced reliability because of the power dissipation therein.

In general, a "keyer" circuit is used to generate a predetermined current level in a resistive or inductive load that is located in standard teletypewriter terminals (TTY's) common in most Telex systems. Most TTY's require plus and minus 60 milliamps of load current to read a data bit. As previously mentioned to deliver the required load current, early designs of keyer circuits used high-voltage power supplies, each connected in series with a variable potentiometer and a mechanical relay switch to connect and disconnect, on command, the power supplies to the load. The setting or value of the variable potentiometer was used to control the amount of current that would flow in the TTY load. This early design suffered from several disadvantages, such as wasted power resulting from the voltage drop across the series potentiometer when the relay was connecting the load to the potentiometer, an electrically noisy environment created by the switching of the mechanical relay, and poor control of the amount of current in the load. Later designs of keyer circuits substituted solid state switching for the mechanical relay switch, to eliminate the slow response time and the inherently noisy electrical spiking that results when mechanical relays are used. However the disadvantages of poor current regulation in the load current, and power losses in the series potentiometer and solid state switch resulting from the high voltage power supplies' continuous connection to the load, were still present.

To solve the problem of current regulation, a series pass regulator was substituted for the series potentiometer such that the high voltage power supply was regulated to supply a constant current to the load. Unfortunately, these keyer designs still required a high power consumption from the power supply, because of the wasted power loss across the series pass regulator and the series switch. As in any large electronic system which dissipates power in the circuit elements, it was necessary to design efficient and costly cooling systems to remove the heat caused by this wasted power, as well as provide large and expensive power supplies to deliver this additional power.

Therefore, it would be advantageous to have a keyer circuit that would provide the requisite load currents but, at the same time, substantially reduce the amount of wasted power in the series elements connected between the power source and the load when "keying" data to the receiver.

SUMMARY OF THE INVENTION

A teletypewriter line keyer with a switching current regulator responsive to a floating, loop current powered voltage comparator used as a loop current monitor. The line keyer, which may have positive and negative line current keying, uses a single current monitor to control positive and negative current regulators responsive to positive and negative keying, respectively. The switching regulators operate within a relatively narrow band centered around the nominal signaling current, with filtering being provided for ripple control. The circuit may also include a keying detector and open loop detector for system monitoring. Use of a switching regulator grossly reduces battery power consumption and keyer circuit heat dissipation, providing more reliable and efficient overall operation.

In accordance with this invention, a keyer circuit is provided for delivering a positive or negative current to a load in which switches are connected in series to the positive and negative power supplies to connect, one at a time, their associated power supplies to the load. Connected between the series switch and the load is an energy storage element that stores energy from the power supply when the power supply is connected to the load. When the power supply is disconnected from the load, a portion of the stored energy in the storage element is delivered to the load. Connected between the storage elements and the load is a load current-sensing means responsive to the level of the load current for generating feedback control signals to the series switches, to control the disconnection of the power supply. A current-sensing element senses the level of load current and causes a comparator to generate control signals to disconnect the power supply when an upper level of load current is sensed. Upon disconnection, the stored energy is delivered to the load from the storage element, resulting in a decreasing level of load current. When the load current decreases to a lower level, the comparator removes the disconnection control signals to permit the reconnection of the power supply. In this manner, during transmission of data, the load current varies between the upper and lower current levels to thereby provide an average current to the load of the required amount.

BRIEF DESCRIPTION OF THE DRAWINGS

For a fuller understanding of the nature and objects of the invention, reference should be had to the following detailed description taken in connection with the accompanying drawings, in which:

FIG. 5(a) and 5(b) are schematic diagrams illustrating the circuitry of FIG. 2 which comprises the secondary switches 114 and 122 of FIG. 7;

FIG. 6 is a schematic diagram illustrating the circuitry of FIG. 2 which comprises the primary switch control and the output current sense amplifier 120 of FIG. 7.

Similar reference characters refer to similar parts throughout the several view of the drawings.

DESCRIPTION OF THE PREFERRED EMBODIMENTS

OUTLINE

BLOCK DIAGRAM OF THE KEYER CIRCUIT
ISOLATION SWITCHES 110 (FIG. 4)
PRIMARY SWITCHES 112 and 124 (FIG. 4)
COMBINING ISOLATION SWITCHES 110 WITH
  PRIMARY SWITCHES 112 AND 124 (FIG. 4)
SECONDARY SWITCHES 114 and 122 (FIG. 5)
OUTPUT CURRENT SENSE AMPLIFIER 120
  (FIG. 6)

BLOCK DIAGRAM OF THE KEYER CIRCUIT

Figure 1:
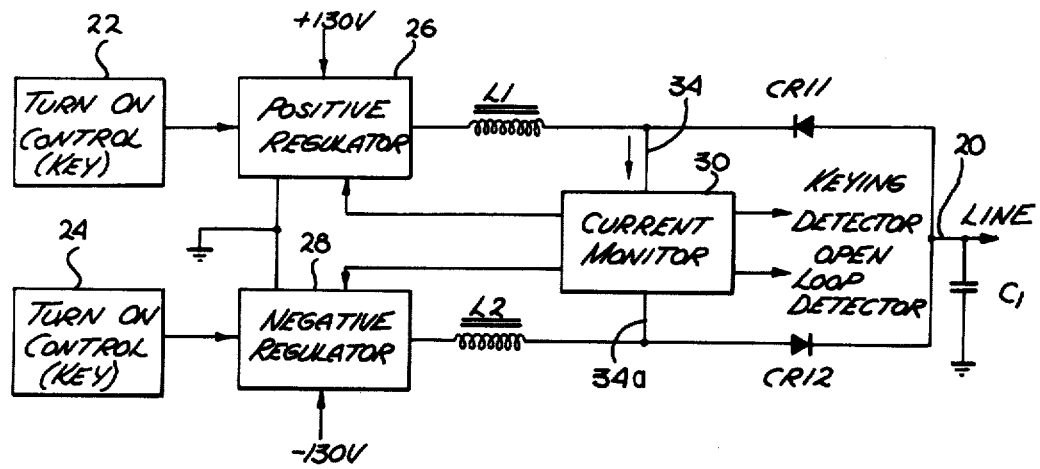
FIG. 1 is a block diagram of the preferred embodiment of the present invention.

First referring to FIG. 1, a block diagram of the preferred embodiment of the present invention may be seen. In a typical line keyer, it is desired to provide a predetermined current on the line 20 responsive to the input switching signal control, which may be either manual or automatic, though generally characterized by a simple ON/OFF signal. In the embodiment shown in FIG. 1, a turn-on control or key is provided for both a positive and negative line current by the turn-on controls 22 and 24. These controls control the positive and negative regulators 26 and 28 respectively, both of which receive a line current control signal from the line current monitor 30. The positive regulator provides an output current through the inductor L1, through the current monitor in line 34, 34a and out onto the line 20 through diode CR12, diode CR11 being back biased and nonconducting at the time. Since the regulator 26 is a switching regulator, inductor L1 sustains the current during the OFF period of the regulator, with capacitor C1 providing filtering of the output. For a negative turn-on signal, negative regulator 28 effectively acts as a current sink, receiving current from the line through diode CR11, through the current monitor 30 and inductor L2, diode CR12 being back biased in this condition. It will be noted, therefore, that in this embodiment a single current monitor is used to monitor both the positive and negative line current and to control the respective regulators as required to sustain the line currents in accordance with the turn-on controls. Also as may be seen in the figure, the current monitor of the preferred embodiment provides additional output signals for indicating keying and for open looped detection.

Figure 2:
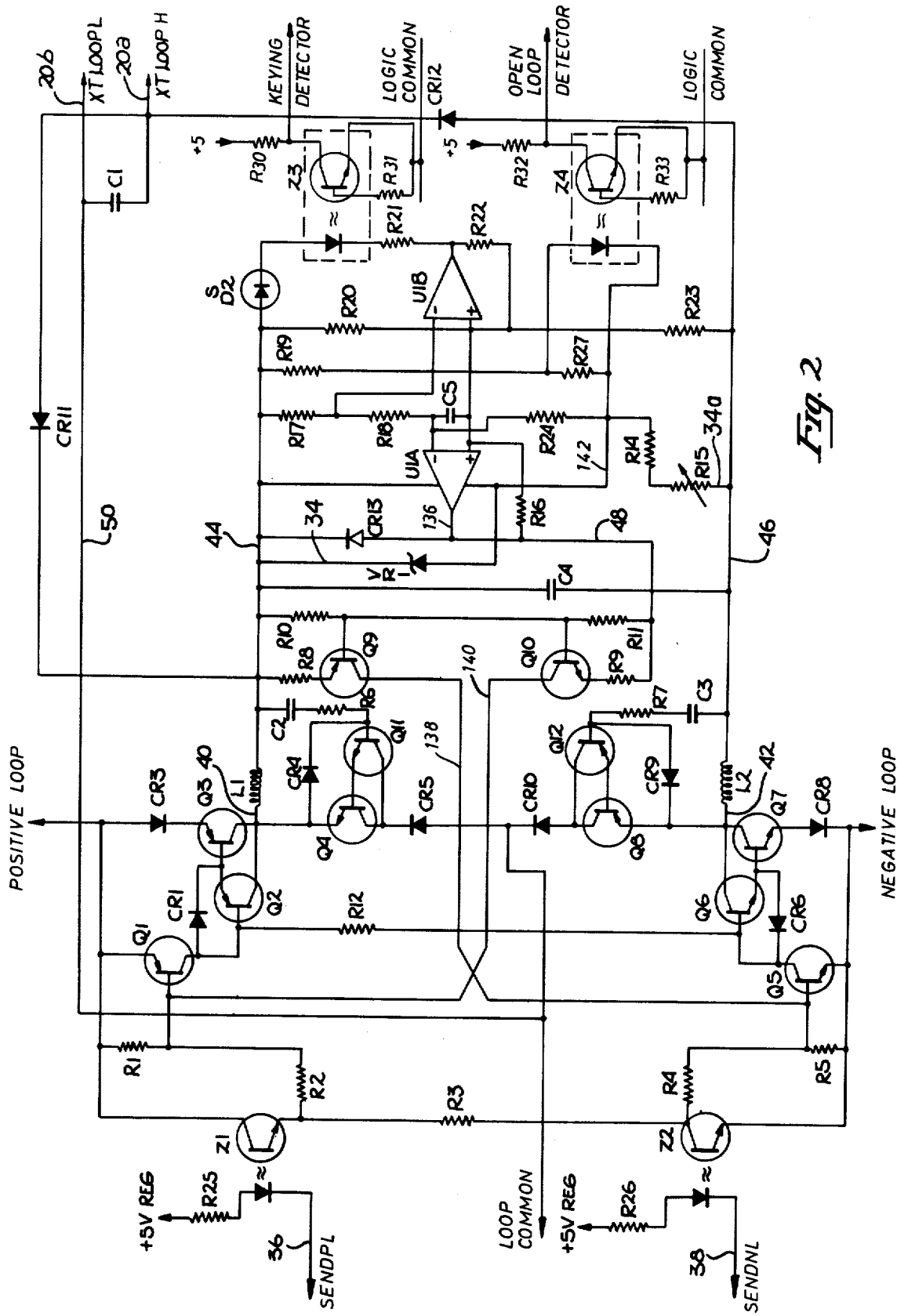
FIG. 2 is a circuit diagram of the preferred embodiment of the present invention.
Figure 7:
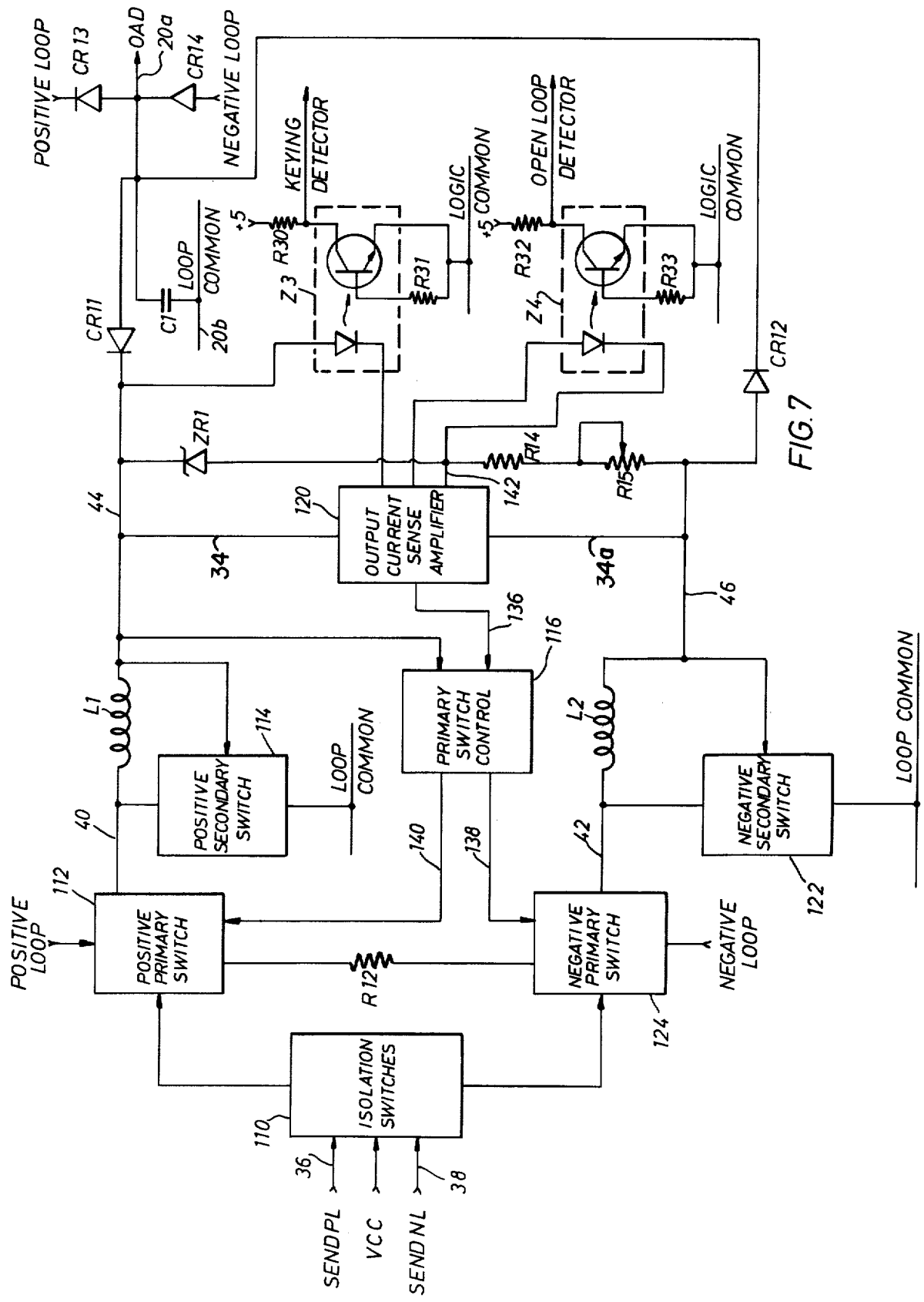
FIG. 7 is an alternate block diagram of the preferred embodiment of the present invention which shows the functional arrangement of the various components of the present invention as shown in FIG. 2.

Now referring to FIG. 2, a circuit diagram of the preferred embodiment of the present invention in accordance with the block diagrams of FIG. 1 and FIG. 7 may be seen. The basic positive and negative keying inputs are applied to lines 36 and 38 respectively, in this embodiment being in the form of switch closures, each for coupling the respective line to a ground with respect to the +5 volt reference. Thus on positive keying the light emitting diode turns on the photo-transistor in the opto-isolator Z1, the current for the light emitting diode being limited by the resistor R25. Similarly, on negative keying, the light emitting diode in the opto-isolator Z2 turns on the photo-transistor, with resistor R26 limiting the current in the LED.

When there is no keying the photo-transistors in both Z1 and Z2 are OFF, so that the combination of resistors R1, R2, R3, R4 and R5 will turn ON transistors Q1 and Q5. With transistor Q1 ON, the base of transistor Q2 is pulled high and the base of transistor Q3 is pulled high through diode CR1, so that Q2 and Q3 are both off. (Diode CR3 provides a voltage drop in the emitter circuit of Q3 of approximately 0.7 volts, assuring the transistor Q1 and diode CR1 will hold transistor Q3 in the OFF condition when Q1 is ON). Similarly, with transistor Q5 ON, the base of transistor Q6 is pulled low and the base of transistor Q7 is also pulled low through diode CR6, thereby turning off both transistors Q6 and Q7, diode CR8 have a function similar to diode CR3. Therefore, no drive is provided to inductor leads 40 and 42, so that the voltage between lines 44 and 46 will nominally be zero provided no drive is being received from the high and low external loop connections 20a and 20b. Accordingly, the light emitting diodes in the opto-isolators Z3 and Z4 will be OFF, so that the photo-transistors themselves will be OFF.

When positive keying occurs, line 36 will be coupled to the 5 volt source ground so that the LED and photo-transistor in Z1 will be turned ON. This raises the base of transistor Q1 high, thereby turning OFF Q1, Q5 being and remaining ON. The base of transistor Q2 is pulled low by resistor R12, turning ON transistors Q2 and Q3 and pulling lead 40 of conductor L1 at a rate equal to the inductance of the inductor divided by the voltage thereacross. (Diode CR5 prevents current flow from line 40 to battery ground when the positive regulator is ON.)

The main current flow path for the loop current is through line 44, zener diode ZR1, resistor R14 and variable resistor R15, with line 46 coupling the loop current through diode CR12 to the high side of the external loop 20a. (Diode CR11 is back biased during conditions of positive loop current.) However, even before the voltage between lines 44 and 46 reaches the zener voltage of the zener diode ZR1, current flows through resistors R19, R27, R14 and variable resistor R15, with the light emitting diode of the opto-isolator Z4 turning the photo-transistor ON in the preferred embodiment as soon as the loop current reaches approximately 1 and 3 milliamps, thereby indicating the presence of loop current, or conversely the absence of an open loop.

As the voltage on line 44 increases with respect to the voltage on line 46, line 48 tends to rise with line 44 by the coupling of resistors R10 and R11, transistor Q10 being maintained OFF since the emitter thereof is coupled through resistor R9 to line 48 also. Also the positive input of comparator U1A is coupled between lines 44 and 46 by the voltage divider comprised of resistors R20 and R23. The negative input of the comparator, on the other hand, is set by a voltage divider comprising resistors R17, R18 and R24 to a reference value within the zener voltage drop of the zener diode ZR1. Accordingly a positive differential input is applied to comparator UA1, with a similar though somewhat less positive differential input being applied to the comparator U1B. (In the preferred embodiment comparators U1A and U1B comprise a dual comparator manufactured by Fairchild and sold as their type LM 393.) In essence the comparator is powered by the voltage drop across the zener diode ZR1, the power supply connections being shown only with respect to comparator U1A as such dual packages utilize unitary power supply connections. Therefore Zener ZR1 serves both as a comparator power supply voltage clamp and a non-linear impedance effecting one of the comparator inputs.) It will be noted that the negative inputs of comparators U1A nd U1B are determined by a voltage divider operating on a voltage across zener diode ZR1 tied to line 44, whereas the positive inputs are determined primarily by a voltage divider (resistors R20 and R23) coupled between line 44 and line 46. Since the voltage of line 44 is increasing with respect ot the voltage on line 46 as loop current is increasing, the positive differential input on the two comparators is decreasing as loop current builds up, comparator U1B being the first to switch to the low state since its negative input is coupled to a higher reference voltage. By selection of the various resistor values, comparator U1B may be caused to switch at approximately 50% of the designated or desired loop current. The switching of the output of comparator U1B low turns ON the light emitting diode of a opto-isolator Z3 through LED SD2 and resistor R21, thereby turning on the LED and phototransistor to provide signals indicative of the loop current status.

Whenever the loop current is increasing in the positive direction, line 44 will be at a lower voltage than line 40 because of the voltage drop across inductor L1, so that the Darlington pair Q4 and Q11 will be OFF, though diode ZR4 limits the charge in capacitor C2 through resistor R6 so that the base of Q11 cannot be more than approximately 0.7 volts higher in voltage than line 40. Also, during this time there is no current therethrough so that lines 42 and 46 will be at the same voltage and the Darlington pair Q8 and Q12 will also be OFF. However, when the loop current reaches the designated value (point A in FIG. 3) the voltage across resistor R14 and variable resistor R15 will have increased to cause the differential input to comparator U1A to change to a negative value. At this point the output of comparator U1A goes low, turning on transistors Q9 and Q10. These transistors have resistors R8 and R9 respectively in their emitter circuits and resistors R10 and R11 respectively in their base circuits so as to act as current sources for driving the bases of Q5 and Q1 respectively. Since Q5 was already ON, no change occurs with respect to the state of devices Q5, Q6 and Q7. However, since Q1 was OFF and the base thereof is now pulled low by the current source through device Q10, Q1 is now turned ON. (Devices Q1 and Q10 are connected as current sources, or perhaps more appropriately a current source and a current sink respectively, so that appropriate control currents are generated for controlling transistors Q5 and Q1 respectively independent of the voltage differential between the battery supply voltages and line 44, which differentials could vary tremendously depending upon the loop impedance). The turning ON of transistor Q1 turns OFF transistor Q2 and Q3, thereby breaking the source of current for inductor L1 through diode CR3 and transistor Q3. This causes the voltage on line 40 to drop, as the voltage drop across the inductor reverses in accordance with the rate of collapse by the field therein. The voltage on line 40 will actually drop below the battery ground voltage, with current then being supplied to the base of transistor Q11 through resistor R6 and capacitor C2 to turn ON the Darlington pair comprised of transistors Q11 and Q4 so that loop current will be temporarily sustained at a decreasing rate through the battery ground, diode CR5 and transistor Q4. Of course when the loop current drops to approximately point B in FIG. 3, the differential input to comparator U1A again goes positive, resetting the conditions hereinbefore described with respect to the initiation of positive keying, turning ON the Darlington pair Q2 and Q3 causing the loop current to again increase, and again turning OFF the Darlington pair Q4 and Q11 and charging capacitor C2 through diode CR4 in readiness for the next switching point.

Figure 3:
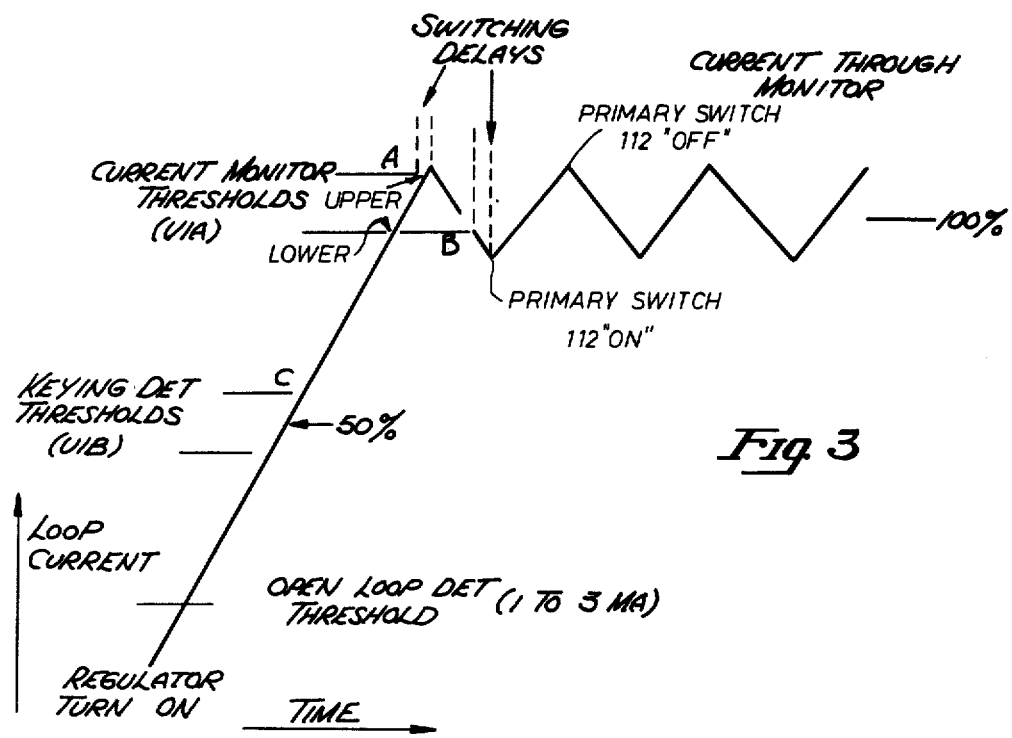
FIG. 3 is a diagram illustrating the current waveform produced by the present invention prior to the capacitive filtering thereof.

It will be noted in FIG. 3 that switching delays are indicated at both points A and B. These delays are purposely imposed to provide more positive switching, and are the combined result of capacitor C5 and resistor R16. In particular capacitor C5 provides some slight time lag in the differential input in comparator U1A, with resistor R16, a relatively large resistor, providing slight positive feedback for more positive toggling action of the comparator. In that regard a similar positive feedback is provided by resistor R22 for the comparator U1B, though this toggling occurs at approximately 50% of the loop current as indicated at point C of FIG. 3, out of the switching range between points A and B. Capacitor C4 provides suppression of noise between lines 44 and 46. Capacitor C1, on the other hand, provides direct filtering of the loop drive voltage, thereby effectively filtering the loop current waveform in comparison to the sawtooth current waveform shown in FIG. 3.

In the preferred embodiment, zener diode ZR1 has a zener voltage of approximately 4.7 volts. Resistor R14 and variable resistor R15 provide a voltage drop of approximately 1.3 volts at point C and approximately 2.6 volts around the regulator switching points. Also the RC time constant of resistor R6 and capacitor C2 (also resistor R7 and capacitor C3) is fairly long with respect to the regulator switching rate, but is short with respect to the baud rate to shorten the loop current fall time during the mark to space transition, i.e. current to no current transition. Thus, at the end of keying, opto coupler Z1 is turned OFF, which will turn ON transistor Q1 regardless of the state of the output of comparator U1A to turn OFF transistors Q2 and Q3. Accordingly, this sets the decreasing current conditions through L1, preventing the regulator from switching on again at point B, allowing the loop current to decay to zero and turning OFF light emitting diode SD2 and opto-isolator Z3 as the loop current falls to approximately 50% of specification value and turning OFF opto-isolator Z4 as the loop current falls to the 1 to 3 milliamp range.

On negative keying opto-isolator Z2 is turned ON, establishing a main current flow path from battery ground through line 50 and loop line 20b, with loop line 20a providing current return through diode CR11 to line 44, through the comparator circuits to line 46, inductor L2 and to the negative battery supply through transistor Q8 and diode CR8. It will be noted that current through the comparator circuit or current monitor is the same as for positive keying (see FIG. 1 and FIG. 7 also and the coupling of the current monitor with respect thereto) so that this portion of the circuit functions the same irrespective of the keying polarity. Also because of the symmetry provided in the regulator switches, a full description thereof will not be given herein, as regulator switching and function on negative keying is the same for the complimentary portions of the circuit as hereinbefore described in detail with respect to positive keying.

Simultaneous positive and negative keying, while not operationally desired, will not functionally harm the circuits of the present invention. In particular on such keying opto-isolator Z1 and Z2 are both turned ON, turning OFF devices Q1 and Q5 and turning ON the Darlingtons comprised of Q2 and Q3, and Q6 and Q7 respectively. The main current flow in this case is from the positive battery connection through inductor L1, the current monitor circuit, inductor L2 and out to the negative battery connection (To the extent inductors L1 and L2 are well matched, line 44 will go to a slightly positive voltage in comparison to battery ground and line 46 will go to a slightly negative voltage in comparison to battery ground, whereby diodes CR11 and CR12 will be slightly back biased so that no loop current is imposed on the actual loop.) In this condition the current monitor will effectively be monitoring the current flowing from the positive battery connection to the negative battery connection, regulating as before at the designated "loop current" value. However, when comparator U1A switches to the low state, both Darlingtons comprised of devices Q2 and Q3 and Q6 and Q7 are turned OFF, turning ON the Darlingtons comprised of devices Q4 and Q11 and Q8 and Q12, so that the "loop current" may be maintained at the decreasing rate therethrough. Accordingly, while no real loop current is provided in the event both positive and negative keying occurs, the circuit functions as hereinbefore described to prevent damage or failure of any portion thereof.

It will be noted that comparator U1A and associated circuitry provides a floating loop current powered voltage comparator to monitor the loop current on both positive and negative keying with the comparator providing the required regulator switching signals for the Darlington switches Q2 and Q3 and Q6 and Q7 to provide the switching current regulation for the line keyer. Accordingly the circuit has very low power consumption in comparison to the variable resistance regulators, having substantially no power dissipation between keying and efficiently delivering loop current on keying. Obviously while the use of a floating loop current powered voltage regulator is not required to gain the advantages of the switching current regulator, it is highly advantageous as it provides for the automatic operation thereof on keying without requiring separate switches, etc. for the purpose. Also, obviously the preferred embodiment described herein provides both positive and negative keying and has been described with respect to one specific circuit embodiment, though it is to be understood that the invention is not limited to particular circuits or keying. Thus, while the present invention has been disclosed and described with respect to a preferred embodiment thereof, it will be understood by those skilled in the art that various changes in form and detail may be made therein without departing from the spirit and scope of the invention.

Turning now to FIG. 7, an alternate block diagram of the keyer portion of the line terminator unit is shown. As previously mentioned, the function of the keyer circuit is to provide a current of sufficient magnitude and polarity that subsequent teletypewriter equipment will respond. The power sources from which the requisite load current is generated are plus and minus high-voltage power supplies. The high-voltage from these power supplies are referred to as the loop voltages. Input logic signals are used to "key" the subsequent circuits of the keyer to deliver the requisite currrent to the load. The circuits of the keyer design incorporate switching techniques, hereinafter more fully described, to minimize wasted power while delivering the required current to the load. Both positive and negative current pulses are supplied to the load by the keyer circuits.

Still referring to FIG. 7, input logic keying control signals SENDPL (line 36) and SENDNL (line 38), originating in the parallel-to-serial converter circuit of the line terminator unit, control the functions of the keyer circuit. The design of the keyer circuit is such that the logic state of the two input control signals SENDPL and SENDNL, which controls the state of the current delivered to the load, can be changed by appropriate jumpers. The input logic signals are generated by circuits that use a substantially lower voltage than the high voltages that supply the required current to the load. Because of this, isolation switches 110 are used to isolate the two power systems, so that the logic circuits will not be damaged by the higher loop voltages.

The keyer circuits of FIG. 7 function in the following manner: Either SENDPL or SENDNL changes to the correct logic state to control the current status. The character of SENDPL and SENDNL is such that they will not occur simultaneously. For purposes of discussion, assume that SENDPL switches to the appropriate state to send a positive current into the load. Isolation switch 110 converts the low-level input control signal SENDPL into an appropriate high-voltage primary switch control signal, that changes primary switch 112 from a non-conducting to a conducting state. It should be noted that prior to the occurrence of either SENDPL or SENDNL, primary switches 112 and 124, which in association with isolation switch 110 comprise the primary switching means for connecting the loop supplies to the load, are both in a non-conducting state. When primary switch 112 has switched to a conducting state, the positive high voltage loop power supply delivers current to the load; and, when primary switch 124 has switched to a conducting state, the negative high voltage loop power supply delivers current to the load.

With the initial occurrence of SENDPL, primary switch 112 is changed to a conducting state, passing positive loop current into conductor 40. Connected to conductor 40 is inductor L1 through which the positive load current passes. From inductor L1, the positive load current flows through conductor 44, Zener diode ZR1, load current-sensing resistors R14 and R15, diode CR12, and through the load to LOOP COMMON. A feedback voltage from conductor 44 controls the conduction state of secondary switch 114. Positive secondary switch 114 is normally in a non-conducting state. However, when enabled by an appropriate voltage on conductor 44, it provides a circuit connection from inductor L1 to LOOP COMMON. This enabling voltage for secondary switch 114 occurs when primary switch 112 is switched from a conducting to a non-conducting state. The load current sensing resistors R14 and R15, in association with output current sense amplifier 120 and primary switch control 116, comprise the load current-sensing means that generates feedback control signals to the primary switch means 112 and 124 to control their conduction state. Inductor L1 and positive secondary switch 114 comprise a first energy storage means, while inductor L2 and negative secondary switch 122 comprise a second energy storage means. The first and second energy storage means together comprise an energy storage means for storing energy when either of the loop power supplies are connected to the load and for using that stored energy to supply load current when the connected power supply is disconnected from the load.

When primary switch 112 is switched to a conducting state, positive load current begins to increase in the positive current path. As the load current increases, the voltage drop across the series connection of current sense resistors R14 and R15 also increases. When the current in the load reaches a first value, or first upper level, the voltage drop across the series connection of resistors R14 and R15 causes output current sense amplifier 120 to switch states and change the output voltage that is applied to conductor 136. The voltage on conductor 136 in conjunction with the voltage on conductor 44 are the input signals to primary switch control 116. Primary switch control 116 functions as a feedback signal generator to generate feedback control currents in conductors 138 and 140 to control the conduction state of primary switches 124 and 112, respectively. When the load current has increased to the upper level as a result of the turning on of primary switch 112, primary switch control 116, in response to current sense amplifier 120, generates a feedback control current in conductors 138 and 140. Feedback current in conductor 138 assures that primary switch 124 cannot now turn on. Feedback current in conductor 140 causes primary switch 112 to switch from a conducting to a non-conducting state. For a negative current pulse generated when primary switch 124 is conducting rather than a positive pulse as above-described, the feedback currents in conductors 138 and 140 cause the opposite results to occur in primary switches 112 and 124, i.e., 112 is prevented from turning on and 124 is turned off.

When primary switch 112 turns off, the voltage across inductor L1 reverses its polarity, which in turn causes positive secondary switch 114 to conduct. Although primary switch 112 has been turned off, current will continue to flow in the positive load current path due to the stored energy contained within the storage element L1. Because positive secondary switch 114 is now conducting and providing L1 with a circuit connection to LOOP COMMON, and because the voltage across inductor L1 has reversed, the stored energy in inductor L1 can be delivered to the load without reversing the polarity of the load current. The current that flows in the load due to the energy stored in inductor L1 will begin to decay as the stored energy is delivered to the load. As the load current decreases, the sense voltage generated across resistors R14 and R15 likewise decreases. When the voltage drop across these two resistors reaches a lower level output current sense amplifier 120 switches back to its initial state. The resulting voltage on conductor 136 removes the feedback control currents in conductors 140 and 138, permitting either primary switch 112 or 124 to again turn on. Since primary switch 124 has not been enabled by the input logic signals, it does not turn on. If primary switch 112 is still enabled, it does turn on. With primary switch 112 again in the conducting state, load current begins increasing from the lower value back toward the upper value (see FIG. 3).

The process of switching primary switch 112 on and off will continue as long as logic signal SENDPL is in an enabling state. The results of the above-described technique in which the load current varies between a upper current level and a lower current level results in an average load current of the required amount.

Still referring to FIG. 7, for the case in which logic signal SENDNL is in the correct logic state to switch negative current to the load, the functioning of the keyer circuits is basically the same as for SENDPL. For a negative current, the negative current path is from the negative loop supply through primary switch 124, inductor L2, current sense resistors R14 and R15, Zener diode ZR1, diode CR11, and through the load to LOOP COMMON. Negative secondary switch 122 functions in a similar manner as positive secondary switch 114 to provide a circuit connection to LOOP COMMON for inductor L2 when primary switch 124 is switched from a conducting to a non-conducting state. The output current sense amplifier 120 functions the same for a negative current pulse as for a positive current pulse. Diodes CR11 and CR12 function as a load current direction control means to cause the load current to flow through the load current sensing element (resistors R14 and R15) in the same direction for both positive and negative load currents. This causes the voltage drop across the sensing element to be in the same direction in both cases.

The output voltage that is developed on the output conductor 20a of the keyer circuits is capacitively coupled through capacitor C1 to LOOP COMMON to filter out switching frequency components in the resulting voltage signal developed across the load. Also attached to conductor 20a are diodes CR13 and CR14, which act as voltage limiters to limit the voltage swing on conductor 20a between the positive and negative loop power supply voltages. Zener diode ZR1, which is in the path for both positive and negative load currents, functions to provide a low voltage power supply for the integrated circuits of output current sense amplifier 120. Finally, opto-isolation switches Z3 and Z4, in response to output current sense amplifier 120 and the load current, respectively, function as the keyer state generators to generate feedback logic signals to indicate the status under which the keyer circuits are operating, i.e. generate KEYING DETECTOR and OPEN LOOP DETECTOR.

Referring now to FIG. 2, a schematic diagram of the preferred embodiment of the present invention is shown. The various components, illustrated in FIG. 2, which are interconnected to form the circuits of the present invention are not functionally identified in FIG. 2 in accordance with the block diagrams of FIG. 1 or FIG. 7. However, FIGS. 4, 5 and 6 do illustrate the circuits shown in FIG. 2 separated according to the functional blocks of FIG. 7. The following is a discussion of the operation of the various circuits of the preferred embodiment of the present invention as functionally illustrated in FIG. 7 and more particularly illustrated in FIG. 2.

ISOLATION SWITCHES 110 (FIG. 4)

Figure 4:
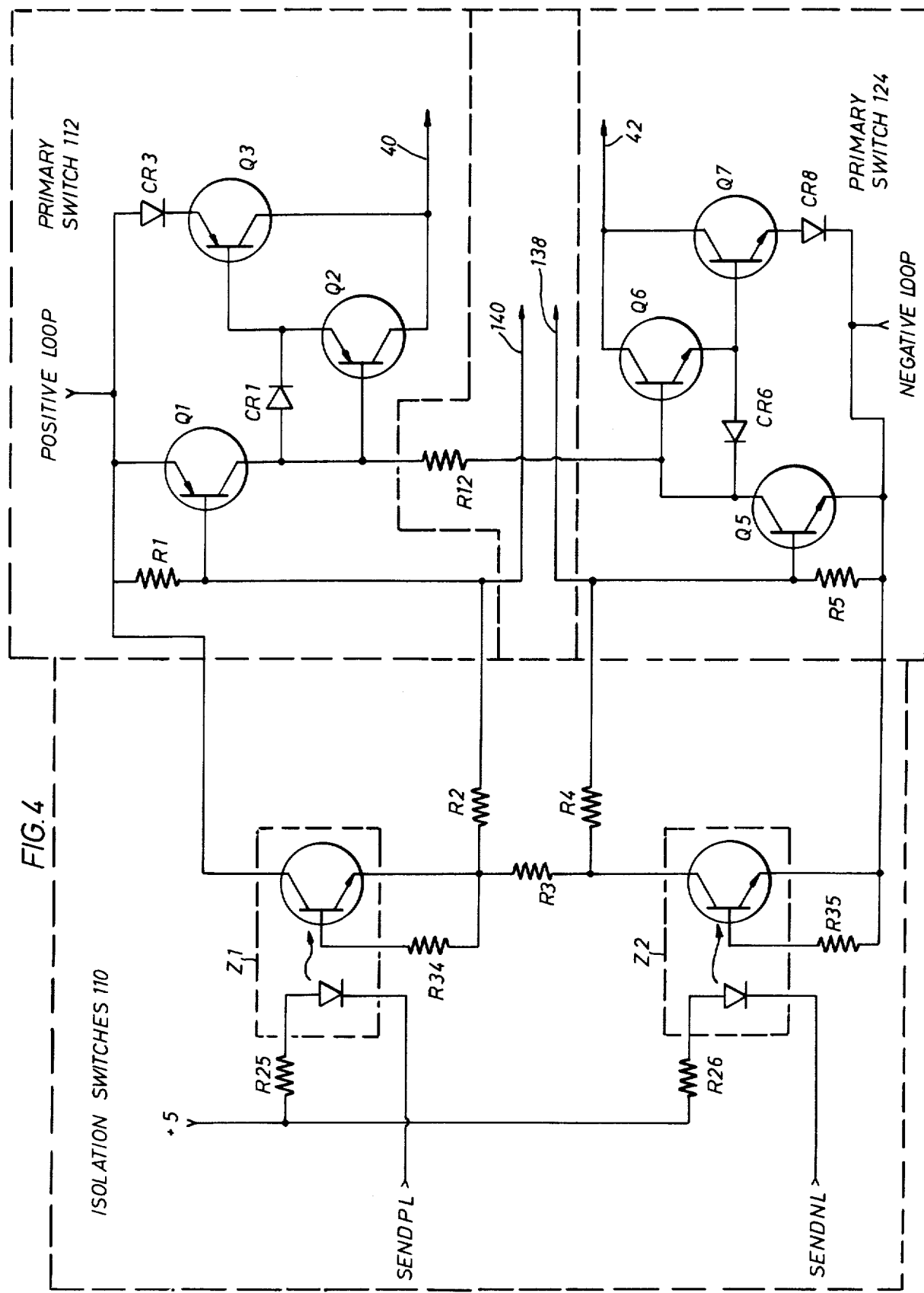
FIG. 4 is a schematic diagram illustrating the circuitry of FIG. 2 which comprises the input isolation switches 110 and the high voltage primary switches 112 and 124 of FIG. 7.

Isolation switches 110 are shown in FIG. 4 as transistors Z1 and Z2. Isolation between the low voltage logic circuits and the high voltage keyer circuits is achieved by the use of an optical link between a light emitting diode and a phototransistor. For the preferred embodiment, the light emitting diode (LED) and photo-transistor combination comes as a single unit, such as model SC005 manufactured by the General Electric Corporation. The opto-isolator switch of isolation switches 110 is used in other portions of the keyer circuits. The operation of the opto-isolator switch in each place that it is used is the same and a discussion of only one will be given. The opto-isolation switch functions as follows: The LED emits an optical signal when the diode is forward biased and conducting a sufficient amount of current. This emitted illumination impinges upon the base of the associated photo-transistor to provide a sufficient base current to cause the transistor to turn on. An external base connected to the photo-transistor is provided. A drain resistor is connected between the base and the emitter of the photo-transistor. In this manner, static charges are not allowed to build up on the base to supply a sufficient base current to allow the photo-transistor to turn on in the absence of the radiation from the LED. Also, the turn-off speed of the isolation switch is improved.

The current that is allowed to flow in the LED must be limited to prevent damage to the diode. As used in isolation switches 110, series resistors R25 and R26 are provided to limit the current that flows in the LED of Z1 and Z2, respectively. The emitter of Z1 is connected to the collector of Z2 through resistor R3. Connected to the emitter of Z1 is resistor R12 which provides an output signal to the primary switch 112. Connected to the collector of Z2 is resistor R4, which provides an output signal to the primary switch 124.

PRIMARY SWITCHES 112 AND 124 (FIG. 4)

Primary switch 112, as shown in FIG. 2, operates as follows: For purposes of discussion, assume that primary switch 112 is in a non-conducting state. For that condition, transistor Q1 is on. With transistor Q1 in a conducting state, the current through resistor R12 is diverted from Q2 base by the easier path through Q1. The voltage differential across Q1 (emitter to collector) will be about 0.3 volts, which is well below the voltage needed to cause current in Q2 base. However, when Q1 is turned off, current will flow through the base emitter junction of Q2 and Q3 via diode CR3 in sufficient magnitude to turn Q2 and Q3 on. When Q2 and Q3 turn on, the positive loop voltage will be applied to conductor 40 through diode CR3 and transistor Q3. Diode CR1 is connected between the base and emitter of transistor Q2 to speed up the "turn off" time of Q3 by providing a low inpenance path to discharge Q3 base charge during the "turn off" time.

In a similar manner, primary switch 124 operates as follows: For purposes of discussion, assume that primary switch 124 is in a non-conducting state. For that condition, transistor Q3 is on. With transistor Q5 in a conducting state, the current through resistor R12 is diverted from Q6 base by the easier path through Q5. The voltage differential across Q5 (emitter to collector) will be about 0.3 volts which is well below the voltage needed to cause current to Q6 base. However, when Q5 is turned off, current will flow through the base emitter junctions of Q6 and Q7 via diode CR8 in sufficient magnitude to turn Q6 and Q7 on. With Q6 and Q7 conducting, the negative loop voltage will be applied to conductor 42 through diode CR8 and transistor Q7. Diode CR6 is connected between the base and emitter of transistor Q6 to speed up the "turn off" time of Q7 by providing a low impedance path to discharge Q7 base charge during the "turn off" time.

COMBINING ISOLATION SWITCHES 110 WITH PRIMARY SWITCHES 112 AND 124 (FIG. 4)

Referring to FIG. 4 for the following discussion of the interaction between isolation switches 110 and the primary switches 112 and 124 which comprise the primary switch means for connecting the loop power supplies to the load. The normal operating level for SENDPL and SENDNL in which neither of the primary switches 112 or 124 are switched on is a logic high state. For a logic high state on those two signals, transistors Z1 and Z2 are in a non-conducting state because no LED currents are generated. Therefore, the current path from positive to negative loop voltage that goes through resistor R3 must also go entirely through resistors R2 and R4 to furnish base current for Q1 and Q5. This results in a forward biased base-to-emitter junctions on transistors Q1 and Q5. Because the base-to-emitter junctions are forward biased, transistors Q1 and Q5 turn on. As previously discussed, with transistors Q1 and Q5 conducting, both darlington connected transistor pairs Q2–Q3 and Q6–Q7 are in a non-conducting state.

Since the logic signals SENDPL and SENDNL will not occur simultaneously, consider the two situations where first SENDPL and then SENDNL switches from a high to a low logic state. When the signal SENDPL switches to a logic low state, a conduction path is provided from the logic supply voltage (VCC) through resistor R25 and the LED of transistor Z1 to logic ground. The resulting current in the LED of Z1 drives phototransistor of Z1 into a conducting state. This diverts the majority of current that previously passed through resistor R2 via the easier path Z1. The resistors R1 and R2 form a voltage divider lowering the voltage across resistor R1 to a level below the thresholds needed by Q1 to conduct. At this point, Q1 is off and Q5 is on. For this condition, a sufficient forward base-to-emitter voltage occurs across transistors Q2 and Q3 to permit them to turn on and apply the positive loop voltage to conductor 40. The negative loop voltage acting through transistor Q5 and resistor R12 provide the base current for transistors Q2 and Q3. The above sequence of events assumes that the feedback current flowing in conductor 140 is not significant to turn Q1 on. The feedback current in conductor 140 is developed by the primary switch control 116 which is discussed more fully hereinafter.

When a feedback current of sufficient magnitude is developed in conductor 140 by the primary switch control 116, transistor Q1 will be permitted to once again turn on. Q1 turns on when a sufficient forward base-to-emitter voltage is developed across Q1 in the presence of feedback current in conductor 140. With transistor Q1 conducting, transistors Q2 and Q3 turn off, thereby removing the positive loop voltage from conductor 40.

Now, assume that SENDNL switches to a low logic state. In a similar manner as for the signal SENDPL, transistor Z2 is switched to a conducting state. As a result, Q5 base current is diverted via Z2. Consequently, the forward base-to-emitter voltage on Q5 is reduced and Q5 is turned off. With Q5 in a non-conducting state, a sufficient amount of base current flows in Q6 and Q7 causing those transistors to turn on. The positive loop voltage applied to resistor R12 through transistor Q1 provides base current for transistors Q6 and Q7. The above sequence of events assumes that no significant feedback current is present in conductor 138. As previously mentioned, feedback current is developed in conductor 138 by the primary switch control 116. The presence of feedback current in conductor 138 permits transistor Q5 to once again conduct. With transistor Q5 conducting, transistors Q6 and Q7 are switched off, thereby removing the negative loop voltage from conductor 42.

SECONDARY SWITCHES 114 AND 122 (FIG. 5)

FIGS. 5(a) and 5(b) illustrate the circuit diagrams for secondary switches 114 and 122, respectively. Secondary switches 114 and 122 are of similar design except that the NPN transistors Q4 and Q11 of secondary switch 114 have become PNP transistors Q8 and Q12 in secondary switch 122. As a result, the secondary switches respond to different polarities of voltages. Because switches 114 and 122 function the same, only a discussion of secondary switch 114 will be provided, it being understood that a person having the ordinary level of skill in the art would recognize and understand the differences in the two circuits.

The function of secondary switch 114 is to provide a circuit connection between LOOP COMMON and the terminal of inductor L1 connected to conductor 40. This circuit connection will permit the current flowing from conductor 40 to conductor 44 through inductor L1 to continue, albeit in a decreasing amount, when the primary loop voltage on conductor 40 is removed. In normal operations, primary switch 112 (see FIG. 7) is switched on to apply the positive loop voltage to conductor 40. This voltage generates a current in inductor L1.

When the primary switch 112 is switched to the non-conducting state, thereby removing the positive loop voltage on conductor 40, the voltage across inductor L1 reverses polarity. This places a positive voltage on conductor 44 that is more positive than the voltage on conductor 40. This voltage is passed through capacitor C2 and resistor R6 to the base of transistor Q11. As a result, a positive base-to-emitter voltage occurs on transistors Q11 and Q4 causing the two transistors to conduct. With transistor Q4 conducting, the positive load current in conductor 44 continues to flow because of the stored energy in inductor L1. The return path to the inductor for this energy is from LOOP COMMON through diode CR5 and transistor Q4. As the energy stored in inductor L1 is delivered to the load, the current in conductor 44 decreases. At the same time, the base voltage on transistor Q11 begins to decrease as capacitor C2 charges to the voltage that is present on conductor 44. The charging rate of capacitor C2 is controlled by the RC time constant of resistor R6 and capacitor C2. This RC circuit functions to speed up decay at the end of a data bit in a serially transmitted character, to thereby reduce distortion in the keyed data bits.

It will be understood that, in lieu of the inductive storage elements above described, other types of storage elements may be employed, such as capacitors and batteries.

The Darlington connection of transistors Q4 and Q11 continues to conduct until primary switch 112 is again switched to a conducting state, thereby applying the positive loop voltage to conductor 40. With the positive loop voltage on conductor 40, diode CR5 is reverse biased and thereby removes the circuit connection between inductor L1 and LOOP COMMON. Transistors Q4 and Q11 are also switched off by the reverse biasing of the base-to-emitter voltage generated when the positive loop voltage appears on conductor 40.

Diode CR4 of secondary switch 114 is connected from the emitter of Q4 to the base of Q11 to protect the base-emitter junctions of those two transistors from excessive reverse bias voltages generated during the time that switch 112 is turned on.

OUTPUT CURRENT SENSE AMPLIFIER 120 (FIG. 4)

FIG. 6 illustrates the circuit diagram for the output current sense amplifier 120. This amplifier senses an upper threshold load current and a lower threshold load current to generate a control voltage that will switch off the primary switch generating the current pulse in the load. Output current sense amplifier 120 of the preferred embodiment is designed from a dual integrated circuit voltage comparator, such as an LM 393 manufactured by Fairchild. It will be appreciated by a person of ordinary skill in the art that voltage comparators of different manufacturers, different numbers of comparators per IC chip, etc., may be substituted for those described herein.

As discussed in connection with the block diagram of the keyer portion of the line terminator design, the load current passes through Zener diode ZR1 and current-sensing element such as sense resistors R14 and R15, regardless of whether the current is positive or negative. In either case, the stand-off Zener voltage drop across diode ZR1 develops the supply voltage for the voltage comparator integrated circuits U1A and U1B. In this embodiment, the Zener voltage is approximately five volts.

The output current sense amplifier 120 functions as follows: The voltages that are present on the inverting and non-inverting input of voltage comparator U1A are compared to generate the output control signal on conductor 136. The signal on conductor 136 is fed to the primary switch control 116. The voltage on the inverting input of comparator U1A has a magnitude that lies between the value of the voltage on conductor 44 and a value equal to the voltage on conductor 44 minus the Zener voltage drop. The voltage on the inverting input of comparator U1A is set by the resistor voltage-divider network composed of resistors R17, R18 and R24.

The voltage of the non-inverting input of comparator U1A lies between the value of the voltage on conductor 44 and the value of the voltage on conductor 46. This voltage is set by the voltage-divider resistor network composed of resistors R23 and R20. The voltage on conductor 46 is equal to the voltage on conductor 44 minus the sum of the Zener diode ZR1 drop and the voltage developed across the current sense resistors R14 and R15. With respect to the voltage on conduction 44, the voltage on the inverting input of comparator U1A is very nearly constant because it is a fixed percentage of the Zener diode voltage. However, with respect to the voltage on conductor 44 the voltage on the non-inverting input is variable and controlled by the voltage across sensing resistors R14 and R15.

The voltage divider resistors that determine the voltages on both inputs of comparator U1A are chosen such that when the current in resistors R14 and R15 are below an upper threshold value, a voltage difference is developed across the two inputs of comparator U1A to cause the output on conductor 136 to substantially equal the voltage on conductor 44. When the upper level load current is reached, the voltage developed across resistors R14 and R15 due to that current, switches the output voltage of comparator U1A. The output voltage on conductor 136 then assumes a value substantially equal to the voltage on conductor 44 minus the voltage across the Zener diode ZR1. This is the same as the voltage on conductor 142. With the voltage on the output of comparator U1A equal to the voltage on conductor 142, primary switch control 116 is able to develop feedback control signals that switch off the primary switch which is at that time conducting.

As a result of turning the primary switch off, the current in sense resistors R14 and R15 begins to decrease. When the current in resistors R14 and R15 reduces to the lower level, comparator U1A once again switches to its initial output voltage. This causes the primary switch control 116 to terminate the feedback signals, allowing the primary switch that is generating the current pulse to once again turn on. The difference between the first upper threshold voltage and the second lower threshold voltage across current sense resistors R14 and R15 is determined by the hysteresis of comparator U1A. The hysteresis is controlled by feedback resistor R16. Capacitor C5 is connected from the non-inverting to the inverting input of comparator U1A and provides a high frequency filter to eliminate high frequency oscillations in the output of the comparator and to provide for a slight delay in the toggling action of comparator U1A (see FIG. 3). That is, capacitor C5 provides some slight time delay in the differential input in comparator U1A, with resistor R16 providing positive feedback. FIG. 3 illustrates the current waveform produced in the load for positive keying currents. The upper and lower levels of current in the load which cause comparator U1A to switch states are also illustrated.

Also shown in FIG. 6 is comparator U1B, whose output signal, in conjunction with the voltage on conductor 44, indicates if a keying current pulse is being generated. Comparator U1B operates as follows: The voltage on the non-inverting input of comparator U1B is the same voltage that was developed on the non-inverting input of comparator U1A as previously discussed. The voltage that is applied to the inverting input of comparator U1B is similar to the voltage on the inverting input of comparator U1A but of a more positive potential. This causes comparator U1B to switch states at an upper level of load current which is less than the upper level for comparator U1A (approximately 50% of the keying current in the load).

Referring again to FIG. 6, the output voltage on conductor 136 in association with the voltage on conductor 44 provides the control voltages to transistors Q9 and Q10 of primary switch control 116 to develop the feedback control currents in conductors 138 and 140. The primary switch control 116 functions as follows: When the voltage on the output terminal of 136 is equal to the voltage on conductor 44, transistors Q9 and Q10 are both in a non-conducting state, because there is not an adequate base-to-emitter voltage present to sustain conduction. When the voltage on conductor 44 is sufficiently more positive than the voltage on conductor 136, which occurs when the upper current level is reached in the sense resistors R14 and R15, transistors Q9 and Q10 are both switched to a conducting state. This in turn generates feedback control current in both conductors 138 and 140. The presence of feedback currents in conductors 138 and 140 produces two results. First, the primary switch that is not currently conducting current is kept in a non-conducting state; and second, the primary switch that is currently conducting current is switched off. Transistors Q9 and Q10 continue to conduct until the lower current level is reached, at which time comparator U1A switches to once again turn transistors Q9 and Q10 off. This removes the feedback currents, thus allowing the primary switch that is enabled to once again turn on. Resistors R8 and R9 cause Q9 and Q10, respectively, to act as constant current controllers to control the feedback current from the primary switch control 116 for all loop supply voltage.

Also shown in FIG. 6 are opto-isolation switches Z3 and Z4. Switch Z3 detects when there is keying current in the load. As shown in FIG. 3, at point C, comparator U1B switches state to produce a forward bias voltage across the LED diode of Z3 to cause Z3 to produce the KEYING DETECTOR signal. Comparator U1B switches states at approximately 50% of the desired loop current in the load.

Isolation switch Z4 is provided to detect when the load current has dropped to the range of 1 to 3 milliamp range. At this level of current, the signal OPEN LOOP DETECTOR is produced since the forward voltage applied to the LED of Z4 will have dropped to a level low enough to prevent the switch from remaining in a conducting state which state exists when a load current greater than 3 milliamps is present.

It will be noted that output current sense amplifier 120 and associated circuitry provides a floating loop current powered voltage comparator to monitor the loop current on both positive and negative keying with the sense amplifier 120 providing the required switching signals for the primary switches 112 and 124. Accordingly, the circuit has very low power consumption in comparison to the variable resistance regulators, having substantially no power dissipation between keying and efficiently delivering loop current on keying.

In summary, the keying circuit described above operates, on command, to selectively connect positive and negative power sources to a resistive or inductive load to thereby generate a desired current in that load. During the connection time for the power sources, the load current stores energy in a series connected storage element as the load current is increasing in the load. At an upper level of load current, a load current sensor generates a feedback control signal to disconnect the power source that is generating the load current. When the power source is disconnected, the energy storage element is then operatively connected to the load to continue to supply a load current in the same direction as before, but of a decreasing magnitude. When the load current decreases to a lower level, the load current sensor removes the feedback control signal to enable the reconnection of the power source. As a result, the load current varies between an upper and lower value to generate an average load current of the desired amount.

In describing the invention, reference has been made to its preferred embodiment. However, those skilled in the art and familiar with the disclosure of the invention may recognize additions, deletions, substitutions or other modifications which would fall within the purview of the invention as defined in the appended claims.

What is claimed is:

1. A switching network for selectively delivering an average current from either a negative power source or a positive power source to a load, comprising:
(a) switching means responsive to input keying control signals for connecting one of the power sources to the load, the load current forming the loop current in a loop which includes the connected power source supplying the loop current, a portion of said switching means and the load;
(b) a floating, loop current-sensing circuit responsive to the level of either a positive or a negative current in the load, for generating feedback control signals for operating said switching means to disconnect a connected power source from the load, the feedback control signals cooperating with the input keying control signals to control the connection and disconnection of a power source, said floating circuit developing its operating power voltages from the loop current itself; and
(c) an energy storage circuit connected between said switching means and the load, for storing energy when either of the power sources is connected to the load, and for supplying stored energy to the load when the connected power source is disconnected.

2. The network of claim 1, wherein said switching means includes:
(a) first and second isolation switches responsive to the keying control signals, for isolating the signals from the positive and negative power sources, and for generating primary-switch control signals; and
(b) first and second primary switches responsive to the input control signals and the feedback control signals to connect and disconnect said negative and positive power sources, respectively, to said load.

3. The network of claim 2, wherein said energy storage circuit comprises:
(a) first and second storage elements respectively connectable to the positive and negative power sources by said first and second primary switches;
(b) a positive secondary switch connected to said first storage element, for providing a ground return path for the stored energy in said first storage element when said first primary switch is disconnected; and
(c) a negative secondary switch connected to said second storage element, for providing a ground return path for the stored energy in said second storage element when said second primary switch is disconnected.

4. The network of claim 3 wherein said first and second storage elements are inductors.

5. The network of claim 1 wherein said floating loop current-sensing circuit comprises:
(a) a load current-sensing element;
(b) direction control means for controlling the direction of flow of the load current through said sensing element to be the same direction for both positive and negative load currents;
(c) a comparator responsive to said load current-sensing element, for generating an output signal having a first state when the load current reaches an upper level higher than the average current level and having a second state when the load current reaches a lower level lower than the average current level; and
(d) a feedback signal generator responsive to said comparator output signal for generating the feedback control signals to disconnect said connected power source when said comparator output is in the first state and to enable reconnection of the power sources when said comparator output is in the second state.

6. The network of claim 5 wherein said load current-sensing element is a resistor.

7. The network of claim 5 wherein said direction control means comprises:
first and second diodes each having one terminal operatively connected to said energy storage circuit and one terminal connected to the load, said load current-sensing element operatively connected between the diode terminals which are connected to the energy storage means, said first diode conducting only positive load currents and said second diode conducting only negative load currents.

8. A switching network for delivering an average current from either a negative power source or a positive power source to a load comprising:
(a) first and second primary switches respectively responsive to first and second primary switch control signals for respectively connecting said positive and negative power sources selectively to the load, the load current forming the loop current in a loop which includes the connected power source, said primary switch connecting the connected power source and the load;
(b) a floating, loop current-sensing means responsive to the current in said load, for generating control signals for operating said primary switches to disconnect the connected power sources when an upper level of load current higher than the average current level is sensed, and to enable reconnection of the disconnected power sources when a lower level of load current lower than the average current level is sensed, said current-sensing means developing its internal operating power voltages from the loop current itself; and (c) first and second energy storage circuits, respectively connected between said first and second primary switches and the load, each energy storage circuit storing energy when its associated power source is operatively connected to the load through its associated primary switch, and delivering the stored energy to the load when its associated power source is not so connected.

9. The network of claim 8, wherein said first and second energy storage circuits comprise:

(a) first and second storage elements respectively connectable to the positive and negative power sources by said first and second primary switches; and (b) first and second secondary switches respectively connected to said first and second storage elements, for providing a ground return path for the stored energy in one of said storage elements when its associated primary switch is disconnected.

10. The network of claim 9 wherein said first and second storage elements are inductors.

11. The network of claim 8 wherein said load current sensing means comprises:

(a) a load current-sensing element;

(b) direction control means for controlling the direction of current flow through said sensing element to be the same direction for both positive and negative load currents;

(c) a comparator responsive to said load current-sensing element, for generating an output signal having a first state when the load current reaches the upper level higher than the average current level and having a second state when the load current reaches the lower level lower than the average current level; and (d) a feedback signal generator responsive to said comparator output signal for generating the feedback control signals to disconnect the connected power source when said comparator output is in the first state and to enable reconnection of the power sources when said comparator output is in the second state.

12. In a teletypewriter switching system, said switching system having, (i) a keyer for transmitting data as a predetermined current level in a load, (ii) a receiver for receiving data from said keyer, and (iii) a power source having both a positive and a negative power supply, the improvement in said switching system comprising an improvement in said keyer, comprising:

(a) primary switch means responsive to the keying control signals for connecting a power supply to the load, said connected power supply delivering a predetermined loop current in said load, the load current forming the loop current in a loop including the connected power supply, said primary switch means connecting the connected power supply and the load;

(b) floating, loop current-sensing means responsive to the load current for generating feedback control signals for operating said primary switch means to disconnect the operatively connected power supply from the load, said current-sensing means generating its own internal power supply requirements from the loop current irrespective of the polarity of the loop current; and (c) energy storage means connected between said primary switch means and the load, for storing energy when said primary switch means is operatively connecting a power supply to the load, and for delivering the stored energy to the load when the power supply is disconnected from the load.

13. The keyer of claim 12 wherein said primary switch means comprises:

(a) an isolation switch responsive to the keying control signals, for isolating the keying control signals from the power supply voltages, and for generating primary switch control signals; and (b) first and second primary switches responsive to the primary switch control signals for respectively connecting, one at a time, the positive and negative power supplies to the load.

14. The keyer of claim 13 wherein said isolation switch means comprises first and second opto-isolation switches.

15. The keyer of claim 13 wherein said energy storage means comprises:

(a) first and second storage elements respectively operatively connectable to the positive and negative power supplies by said first and second primary switches; and (b) first and second secondary switches respectively connected to said first and second storage elements for providing a ground return path for the stored energy in its associated storage element when said storage elements' associated primary switch is disconnected from the load.

16. The keyer of claim 15 wherein said first and second storage elements are inductors.

17. The improvement device of claim 12 wherein said floating loop current-sensing means comprises:

(a) a load current-sensing element;

(b) direction control means for controlling the direction of current flow through said sensing element to be the same direction for both positive and negative load currents;

(c) a comparator responsive to said load current-sensing element for generating an output signal having a first state when the load current reaches an upper level higher than the average current level and having a second state when the load current reaches a lower level lower than the average current level; and (d) a feedback signal generator responsive to said comparator output signal for generating the feedback control signals to disconnect the connected power supply when said comparator output is in the first state and to enable reconnection of the power supplies when said comparator output is in the second state.

18. The keyer of claim 12 further comprising a keyer status generator for generating logic status signals to indicate the status of said keyer.

* * * * *